United States Patent
Cote

(10) Patent No.: US 7,502,373 B2
(45) Date of Patent: Mar. 10, 2009

(54) METHOD AND APPARATUS FOR PERFORMING AN IN-SERVICE UPGRADE OF A SWITCHING FABRIC OF A NETWORK ELEMENT

(75) Inventor: Joe Cote, Carleton Place (CA)

(73) Assignee: Alcatel - Lucent Canada Inc., Kanata, Ontario (CA)

( * ) Notice: Subject to any disclaimer, the term of this patent is extended or adjusted under 35 U.S.C. 154(b) by 1192 days.

(21) Appl. No.: 10/151,451

(22) Filed: May 20, 2002

(65) Prior Publication Data

US 2003/0058854 A1 Mar. 27, 2003

Related U.S. Application Data

(60) Provisional application No. 60/325,341, filed on Sep. 27, 2001.

(51) Int. Cl.
*H04L 12/28* (2006.01)
*H04L 12/56* (2006.01)
*H04J 3/16* (2006.01)
*H04J 3/22* (2006.01)
*H04J 3/24* (2006.01)
*G06F 13/00* (2006.01)

(52) U.S. Cl. .................. 370/392; 370/393; 370/465; 370/474; 710/301

(58) Field of Classification Search ............. 370/389, 370/392–393, 465, 474; 710/301
See application file for complete search history.

(56) References Cited

U.S. PATENT DOCUMENTS

| | | | | |
|---|---|---|---|---|
| 5,991,295 A | * | 11/1999 | Tout et al. ............... | 370/395.7 |
| 6,026,095 A | * | 2/2000 | Sherer et al. ............ | 370/448 |
| 6,363,065 B1 | * | 3/2002 | Thornton et al. ......... | 370/352 |
| 6,389,005 B1 | * | 5/2002 | Cruickshank ............ | 370/352 |
| 6,631,137 B1 | * | 10/2003 | Lorrain et al. ........... | 370/401 |
| 6,667,955 B1 | * | 12/2003 | Blanc et al. ............. | 370/220 |
| 6,683,873 B1 | * | 1/2004 | Kwok et al. ............. | 370/389 |
| 6,686,672 B2 | * | 2/2004 | Brown et al. ............ | 307/125 |
| 6,898,280 B1 | * | 5/2005 | Dombkowski et al. . | 379/399.01 |
| 6,954,851 B2 | * | 10/2005 | Natu ...................... | 713/2 |
| 6,963,575 B1 | * | 11/2005 | Sistanizadeh et al. .... | 370/404 |
| 2002/0012317 A1 | * | 1/2002 | Sakamoto et al. ........ | 370/218 |

FOREIGN PATENT DOCUMENTS

| EP | 0 961 442 A1 | 12/1999 |
|---|---|---|
| WO | WO 00/30300 | 5/2000 |
| WO | WO 01/58082 | * 8/2001 |

\* cited by examiner

*Primary Examiner*—Ronald Abelson

(57) ABSTRACT

A method and apparatus for performing an in-service upgrade of a switching fabric of a network element is described. Network traffic is denominated in cells as it passes through the network element. Prior to the upgrade, an internal header is provided to direct the communication of a cell through the network element. The internal header has internal routing information to direct the routing of the cell through the switching fabric of the network element. Additional internal routing information compatible with upgraded components of a network element is added to the cells passing through the network element. The additional internal routing information is dependent on the internal routing information previously provided in the internal header, but differs from the internal routing information in that it supports the upgraded components of the network element. Thus, prior to the upgrading of a switching fabric in a network element, the internal routing information is used to route the cells through the non-upgraded network components, while, after the upgrading of the switching fabric, the additional internal routing information is used to route cells through the upgraded components of the network element.

22 Claims, 10 Drawing Sheets

METHOD AND APPARATUS FOR PERFORMING AN IN-SERVICE UPGRADE OF A SWITCHING FABRIC OF A NETWORK ELEMENT

RELATED APPLICATIONS

This application claims the benefit of U.S. Provisional Application No. 60/325,341, filed Sept. 27, 2001.

FIELD OF THE DISCLOSURE

The invention relates to network elements in a communication network and, more particularly, to a capability for performing an in-service upgrade of a switching fabric in a network element.

BACKGROUND

In a communication network, a network element is involved in directing network traffic toward its intended destination. Since network traffic can be very dynamic, the environment within a network element is typically also very dynamic. For example, at various times during the operation of the network element, new connections are established, existing connections are maintained, and old connections are released. Occasionally, it is desirable to upgrade the switching fabric within the network element. However, it is typically difficult to reconfigure the network element without adversely affecting the network traffic passing through the network element. Therefore, some loss of data typically occurs when connections are dropped during an attempt to upgrade a network element. Thus, it is desirable to provide the ability to perform an in-service upgrade of a switching fabric in a network element without loss of data.

DETAILED DESCRIPTION OF THE FIGURES

Figure 1:
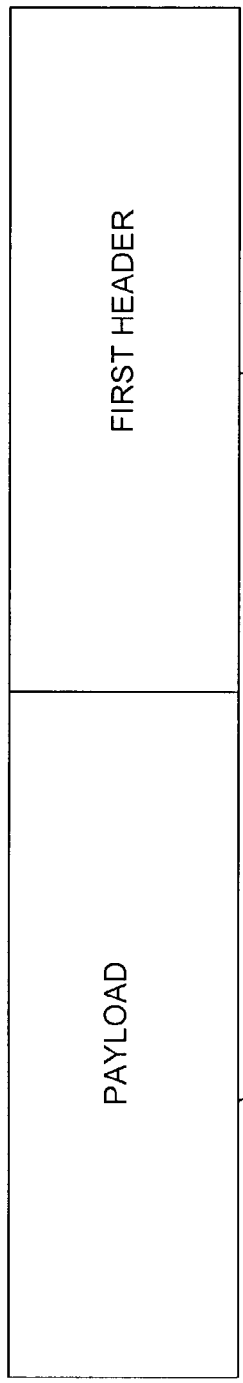
FIG. 1 is a block diagram illustrating an example of a typical cell structure within a network element.

A method and apparatus for performing an in-service upgrade of a switching fabric of a network element is described. Network traffic is denominated in cells as it passes through the network element. Prior to the upgrade, an internal header is provided to direct the communication of a cell through the network element. The internal header has internal routing information to direct the routing of the cell through the switching fabric of the network element. However, if the network element is being upgraded to a different architecture, for example from a single shelf architecture to a multiple shelf architecture, the internal routing information of the internal header may be incompatible with the upgrade components of the network element. Consequently, existing connections having internal headers with previously determined internal routing information may be lost when an upgrade is performed. To prevent the loss of connections and consequent loss of data, additional internal routing information compatible with upgraded components of a network element is added to the cells passing through the network element. The additional internal routing information is dependent on the internal routing information previously provided in the internal header, but differs from the internal routing information in that it supports the upgraded components of the network element. Thus, prior to the upgrading of a switching fabric in a network element, the internal routing information is used to route the cells through the non-upgraded network components, while, after the upgrading of the switching fabric, the additional internal routing information is used to route cells through the upgraded components of the network element.

The additional internal routing information can be added to cells of new connections being established, and it can be added to cells of existing connections. For example, after the commencement of an upgrade process, all new connections can be established such that both the internal routing information and the additional internal routing information are added to cells of that connection. Also, a sub process can be performed in which the additional internal routing information is added to cells of existing connections. Thus, when the network element is ready for the upgrading of the switch fabric, the cells of both new connections and existing connections will be associated with both internal routing information and additional routing information. Thus, those cells can be routed using either the non-upgraded components of the network element or the upgraded components of the network element.

The ability to switch cells using either the non-upgraded components or the upgraded components is useful in a network element. For example, any network element having a redundant architecture, in the event that either the non-upgraded components or the upgraded components were to fail, network traffic could be routed to components of the opposite type. As an example, if non-upgraded network component handling network traffic were to fail, the network traffic could be routed through the upgraded component. As another example, if an upgraded component handling network traffic were to fail, the network traffic could be routed through a non-upgraded component.

As another example, in the event that a problem were to occur during the upgrade process that would indicate the desirability to back out of the upgrade and revert to the original configuration of the network element, the availability of information to allow routing through either the non-upgraded components or the upgraded components avoids incompatibility problems, thereby facilitating a swift transition back to the original configuration of the network element.

FIG. 1 is a block diagram illustrating an example of a typical cell structure within a network element. The cell structure includes a first header 101 and a payload 103. The first header 101 includes internal routing information compatible with non-upgraded components of the network element. The payload 103 includes user data to be transported through the network element.

Figure 2:
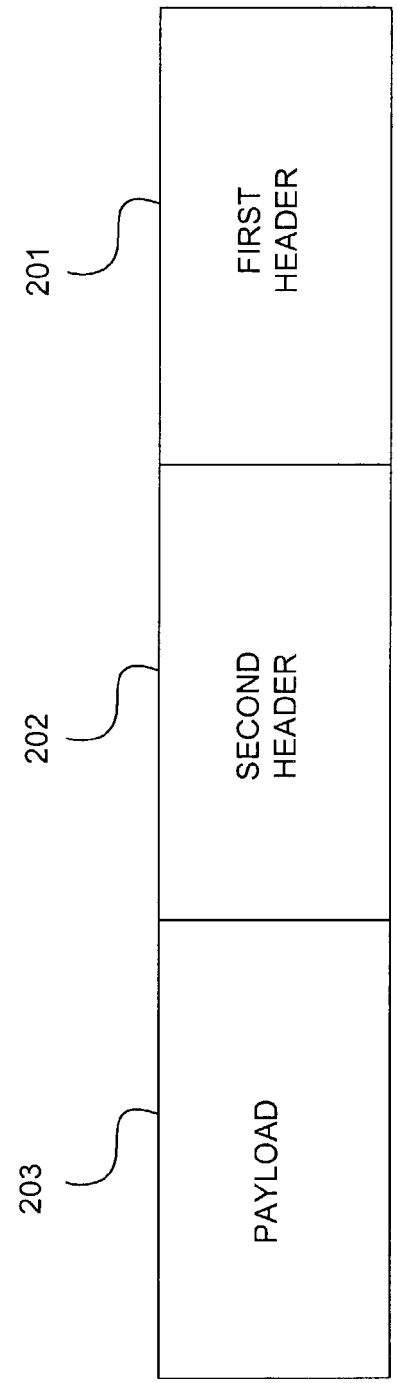
FIG. 2 is a block diagram illustrating a cell structure in accordance with an embodiment of the present invention.

FIG. 2 is a block diagram illustrating a cell structure in accordance with an embodiment of the present invention. The cell structure includes first header 201, second header 202, and payload 203. The first header 201 includes internal routing information compatible with non-upgraded components of the network element. The second header 202 includes additional internal routing information compatible with upgraded components of the network element. The payload 203 includes user data to be transported through either the non-upgraded components or the upgraded components of the network element. First header 201 and second header 202 may be formatted as distinct headers, or they may be a single header with the space for second header 202 defined within the overall single header structure. While the term header is used, it should be understood that the first header 201 and second header 202 may be at the head of a cell, at the tail of a cell, or at any other location within the cell relative to payload 203. The first header 201, the second header 202, and the payload 203 may be of fixed or variable length. If any of the first header 201, second header 202, or payload 203 are of variable length, it is important to ensure that they can be unambiguously identified, for example through the use of unique coding.

Figure 3:
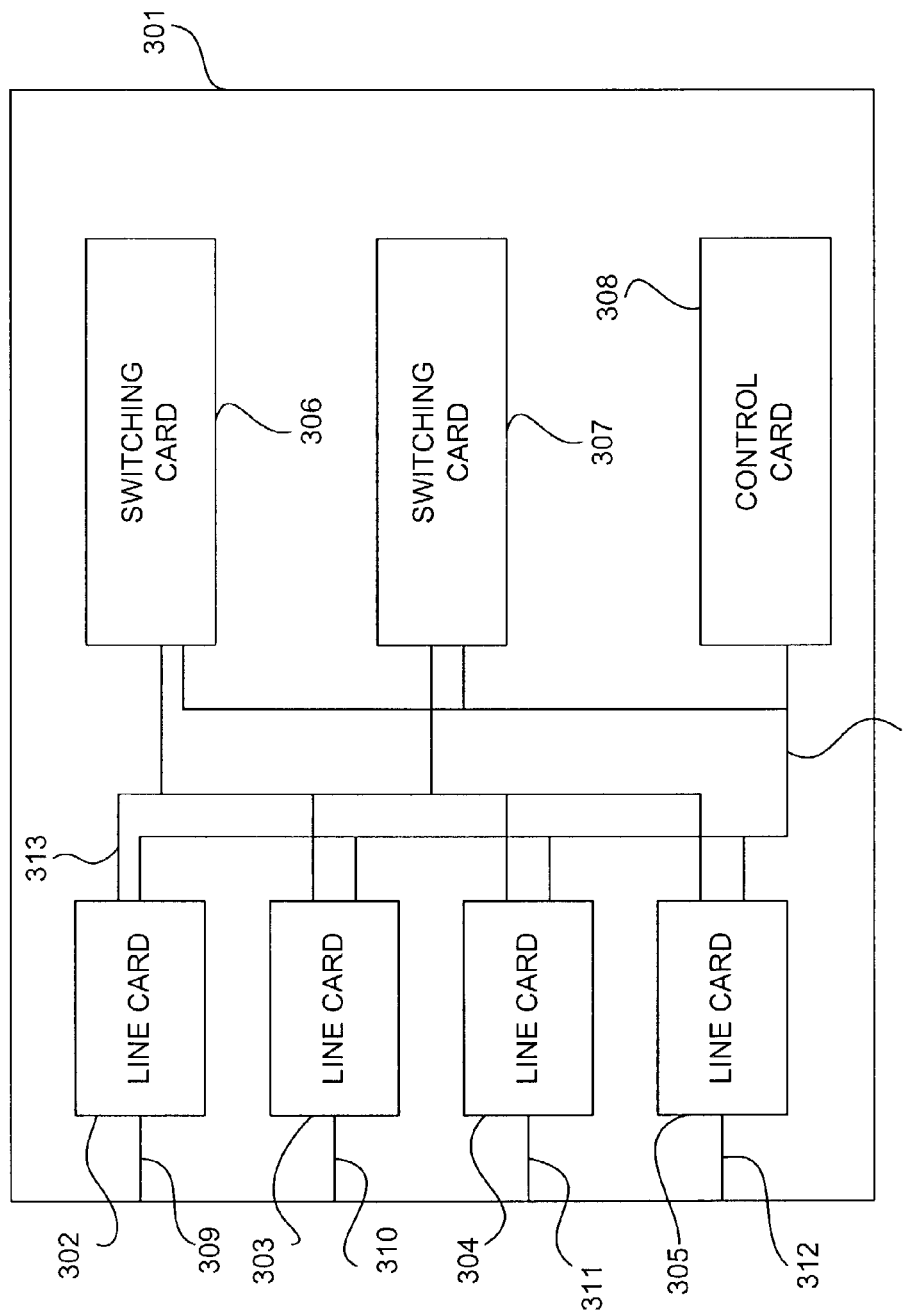
FIG. 3 is a block diagram of a switching system in accordance with an embodiment of the present invention in its non-upgraded state as a single shelf switching system.

FIG. 3 is a block diagram of a switching system in accordance with an embodiment of the present invention in its non-upgraded state as a single shelf switching system. While it is described as a single-shelf switching system, that description is not intended as a limitation on the form factor of the switching system but rather to contrast the switching system with an upgraded switching system. The switching system 301 comprises line cards 302 through 305, switching cards 306 and 307, and control card 308. Communication lines 309 through 312 are coupled to line card 302 through 305, respectively. Line cards 302 through 305 are coupled to switching cards 306 and 307 via coupling 313. Line cards 302 through 305 and switching cards 306 and 307 are coupled to control card 308 via coupling 314. Line cards 302 through 305 provide an internal header containing internal routing information to cells passing through them. The internal routing information of the internal header is compatible with switching cards 306 and 307, allowing switching cards 306 and 307 to properly switch the cells passing through them. Control card 308 provides control of line cards 302 through 305 and switching cards 306 and 307. In accordance with an embodiment of the invention, switching cards 306 and 307 are replaceable by fabric interface cards (and switching shelves, wherein the fabric interface cards are coupled to the switching shelves). Optionally, at least one of line cards 302 through 305 may insert internal routing information into a portion of an internal header other than a predefined field therein designated for additional internal routing information.

Figure 4:
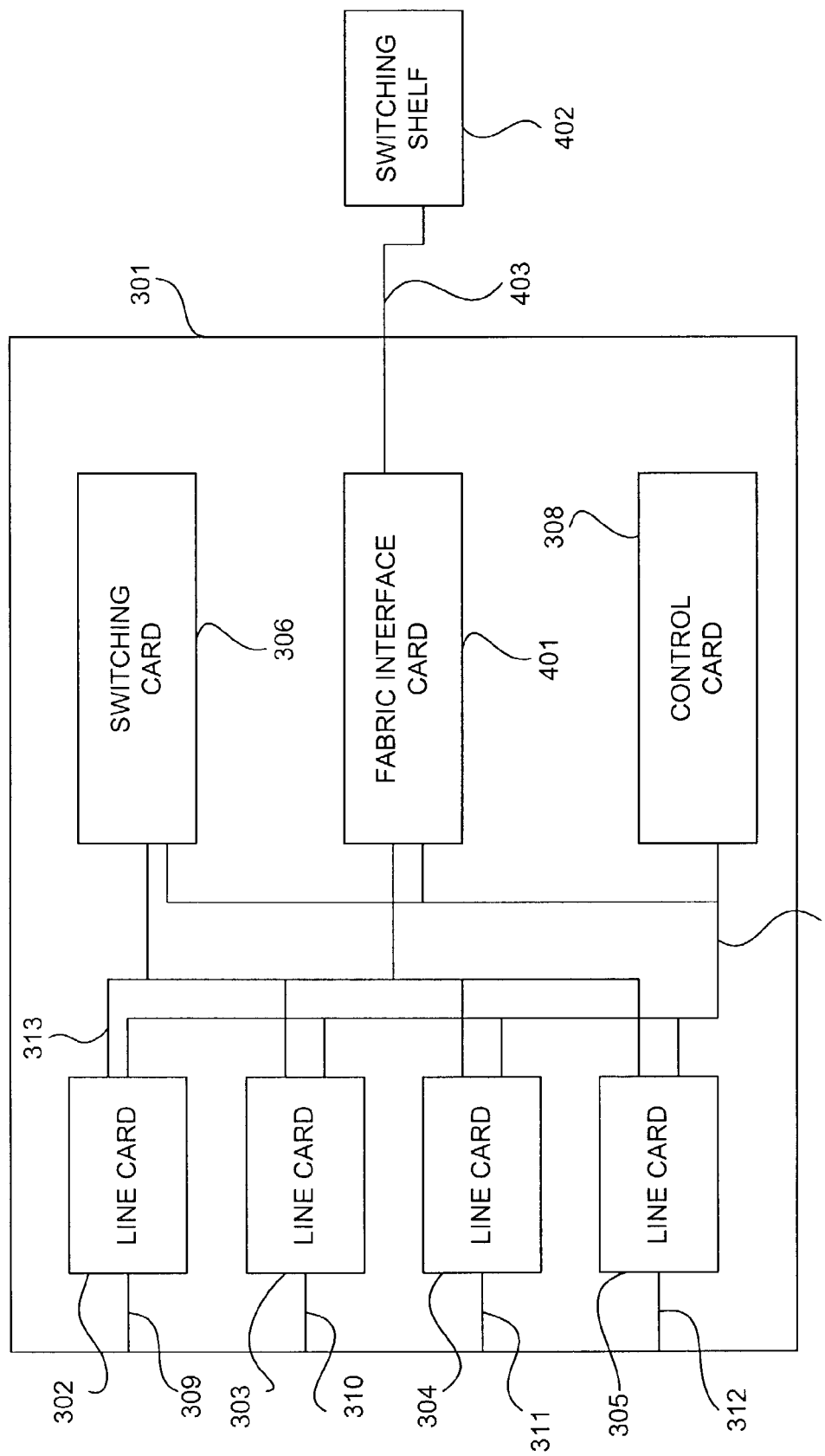
FIG. 4 is a block diagram illustrating a switching system in accordance with an embodiment of the present invention in a partially upgraded state.

FIG. 4 is a block diagram illustrating a switching system in accordance with an embodiment of the present invention in a partially upgraded state. The switching system 301 includes line cards 302 through 305, switching card 306, fabric interface card 401, and control card 308. Communication lines 309 through 312 are coupled to line cards 302 through 305, respectively. Line cards 302 through 305 are coupled to switching card 306 and fabric interface card 401 via coupling 313. Control card 308 is coupled to line cards 302 through 305, switching card 306, and fabric interface card 401 via coupling 314. Fabric interface card 401 is coupled to switching shelf 402 via coupling 403.

Fabric interface card 401 has been installed in place of switching card 307 of FIG. 3. Fabric interface card 401 adapts switching system 301 to utilize the switching fabric of switching shelf 402. However, it is not always possible or preferable to make upgraded components, such as fabric interface card 401 and switching shelf 402 compatible with the internal routing information of the internal headers of cells used in switching systems such as the switching system illustrated in FIG. 3. For example, the internal routing information may provide insufficient capacity to fully describe the appropriate routing for a cell within the context of the expanded routing capability provided by the upgraded components of the network element. Thus, by providing an internal header having both internal routing information compatible with a non-upgraded component, such as switching card 306, and an upgraded component such as fabric interface card 401 and switching shelf 402, either or both of switching card 306 and the combination of fabric interface card 401 and switching shelf 402 may be used to switch any cell passing through the network element. Therefore, if switching card 306 is configured to be redundant with switching shelf 402, any failure of switching card 306 can be accommodated by transferring the network traffic to switching shelf 402, and any failure of switching shelf 402 can be accommodated by transferring the network traffic to switching card 306.

Figure 5:
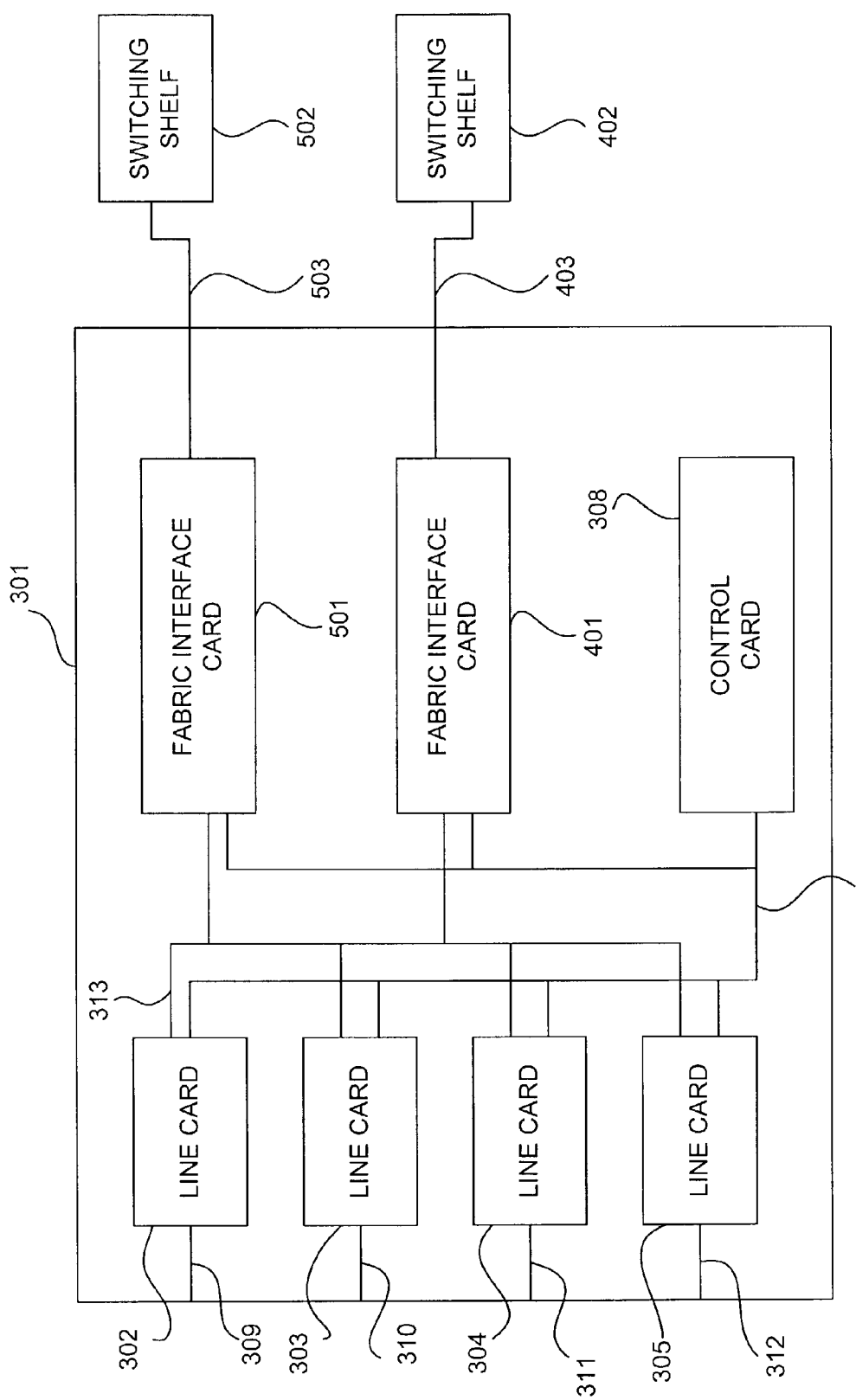
FIG. 5 is a block diagram of a switching system in accordance with an embodiment of the invention in an upgraded state.

FIG. 5 is a block diagram of a switching system in accordance with an embodiment of the invention in an upgraded state. Switching system 301 includes line cards 302 through 305. Communication lines 309 through 312 are coupled to line cards 302 through 305, respectively. Line cards 302 through 305 are coupled to fabric interface cards 401 and 501 via coupling 313. Control card 308 is coupled to line cards 302 through 305 and fabric interface cards 401 and 501 via coupling 403. Fabric interface card 501 is coupled to switching shelf 502 via coupling 503.

Control card 308 programs line cards 302 through 305 to add an internal header to a payload of the cells passing through switching system 301. The internal header includes both internal routing information compatible with non-upgraded components and additional routing information compatible with upgraded components. Fabric interface cards 401 and 501 pass the cells to switching shelves 402 and 502, respectively. Switching shelves 402 and 502, along with their fabric interface cards 401 and 501, respectively, are capable of switching cells in accordance with the additional internal routing information provided in their internal headers. Consequently, the internal routing information originally provided in the internal header is no longer needed in the switching system illustrated in FIG. 5. Thus, once the switching system has been upgraded to the upgraded state illustrated in FIG. 5, the inclusion of the internal routing information originally provided in the internal header may be discontinued and the upgrading process may be concluded. The space in the internal header previously occupied by the internal routing information may be reserved for future use or, if no longer needed, may be eliminated, thereby reducing the size of the internal header. Control card 308 can program line cards 302 through 305 to discontinue the insertion of the internal routing information originally provided in the internal header when appropriate.

Figure 6:
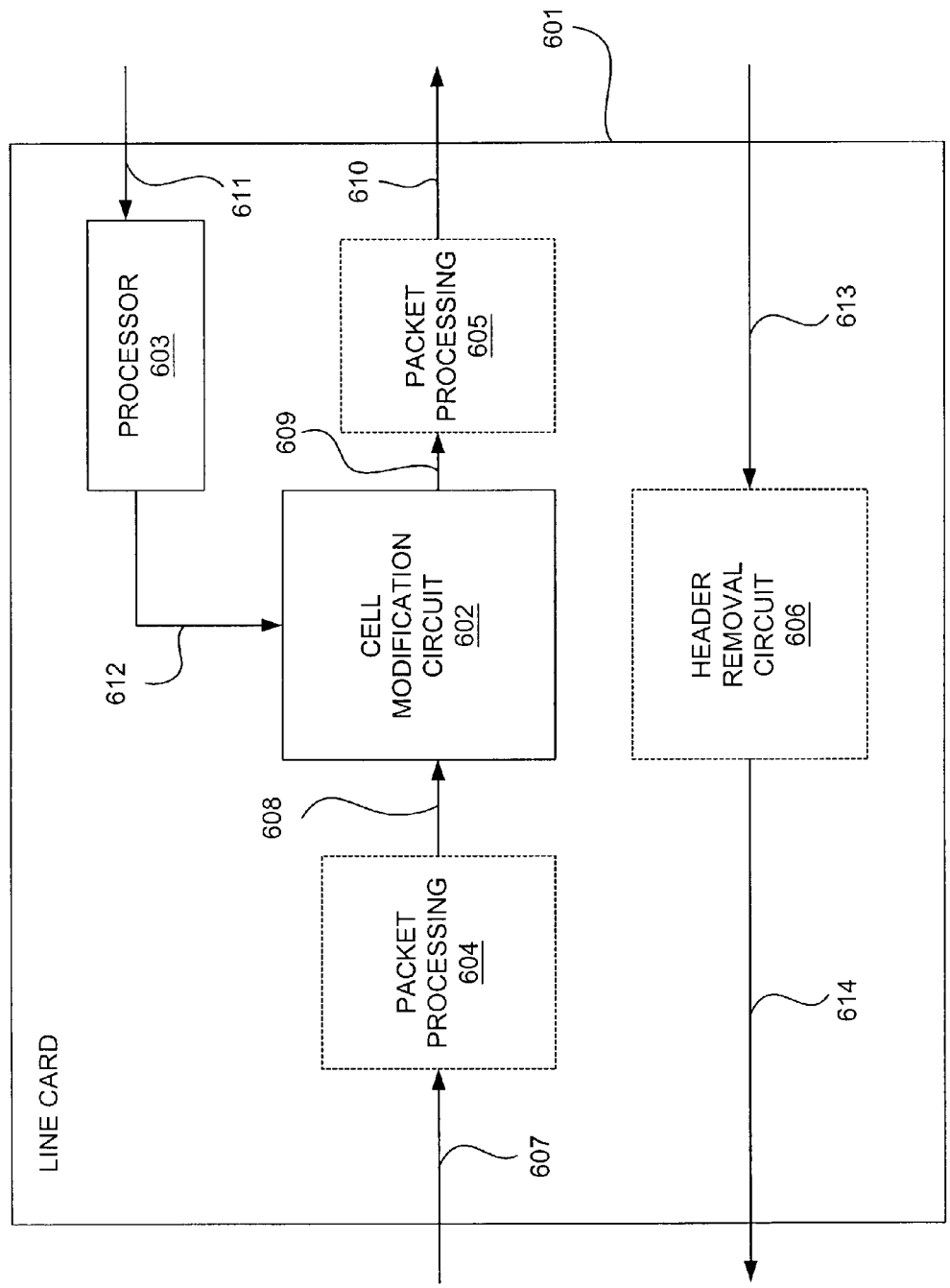
FIG. 6 is a block diagram illustrating a line card in accordance with an embodiment of the present invention.

FIG. 6 is a block diagram illustrating a line card in accordance with an embodiment of the present invention. The line card 601 includes cell modification circuit 602, processor 603, and optionally, packet processing circuit 604, packet processing circuit 605, and header removal circuit 606. Cell payloads received by line card 601 and destined to be switched by the switching fabric of the network element are received at input 607. Input 607 is coupled to optional packet processing block 604 which performs any necessary preprocessing of the cells. Packet processing circuit 604 is coupled via coupling 608 to cell modification circuit 602. A control input 611 from a control card is coupled to processor 603. Processor 603 provides a control output 612 coupled to cell modification circuit 602 to control the operation of cell modification circuit 602. Cell modification circuit 602 modifies cells passing through line card 601 in accordance to the programming provided to it from processor 603 or, externally, from a control card. Cell modification circuit 602 can be programmed to add an internal header to the cells which may contain internal routing information compatible with non-upgraded components, additional internal routing information compatible with upgraded components, or both. Once the cells are modified, cell modification circuit 602 provides the cells an output 609 to packet processing circuit 605. Packet processing circuit 605 performs any necessary post processing of the cells. Optional packet processing circuit 605 provides output 610 to the switching fabric of the network element. Cells are received from the switching fabric of the network element via input 613, which is coupled to header removal circuit 606. The optional header removal circuit 606 removes the internal headers from the cells and forwards them to output 614.

Figure 7:
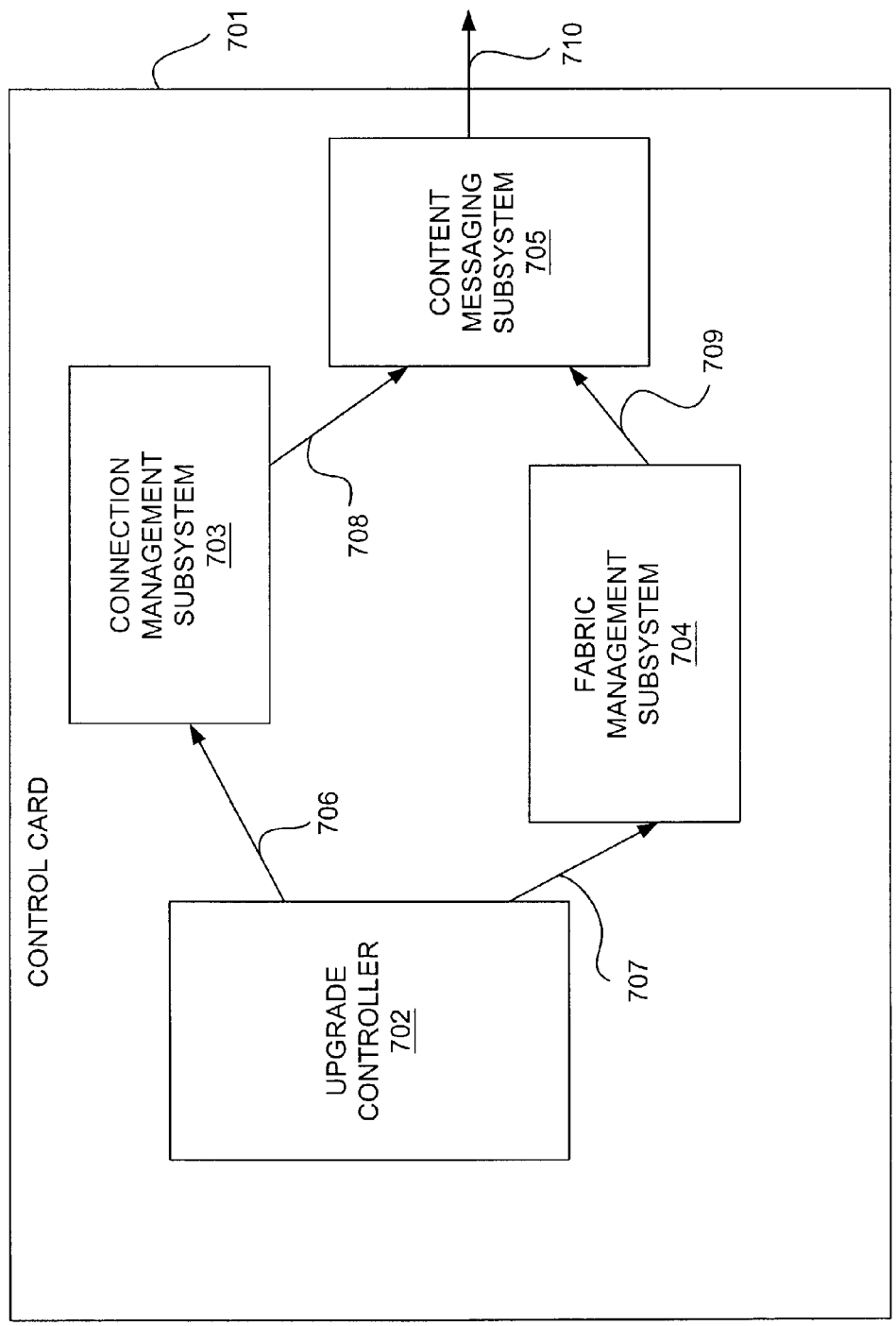
FIG. 7 is a block diagram illustrating a control card in accordance with an embodiment of the present invention.

FIG. 7 is a block diagram illustrating a control card in accordance with an embodiment of the present invention. Control card 701 includes upgrade controller 702, connection management sub system 703, fabric management subsystem 704, and content messaging subsystem 705. Upgrade controller 702 is coupled to connection management subsystem 703 via coupling 706. Upgrade controller 702 is coupled to fabric management subsystem 704 via coupling 707. Connection management subsystem 703 is coupled to content messaging subsystem 705 via coupling 708. Fabric management subsystem 704 is coupled to content messaging subsystem 705 via coupling 709. Content messaging subsystem 705 provides control output 710, which may be coupled to one or more line cards.

The upgrade controller 702 provides control over the upgrade process and controls connection management subsystem 703 and fabric management subsystem 704. Connection management subsystem 703 programs line cards to modify cells to include an internal header. The internal header may include internal routing information. The internal header may also include either additional internal routing information or a predefined field for storing additional internal routing information. Connection management subsystem 703 can also program line cards to omit information from the internal header, for example, either the internal routing information or the additional internal routing information. Fabric management subsystem 704 controls switching fabrics in a network element. For example, the fabric management subsystem 704 can place a switching fabric, such as a switching card or a switching shelf, in an active mode or in an inactive mode.

Content messaging subsystem 705 conveys control instructions from the connection management subsystem 703 and the fabric management subsystem 704 to other components of a network element, for example, line cards and switching fabrics.

Figure 8:
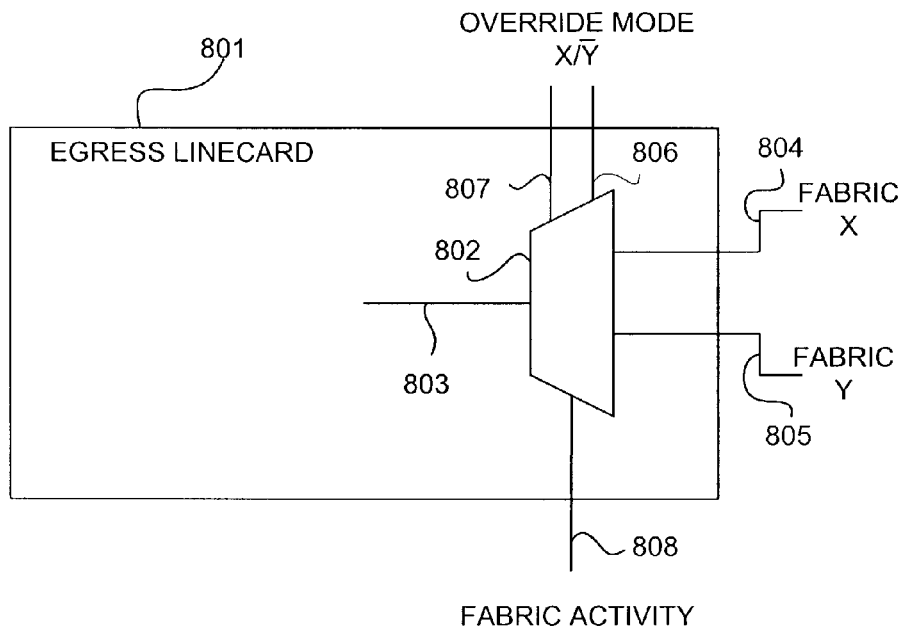
FIG. 8 is a block diagram of an egress line card capable of supporting redundant switching fabrics in accordance with an embodiment of the invention.

FIG. 8 is a block diagram of an egress line card capable of supporting redundant switching fabrics in accordance with an embodiment of the invention. The egress line card 801 may be a separate line card providing an egress path for cells from the switching fabric or merely a portion of a line card providing such an egress path. Egress line card 801 includes multiplexer 802, which receives input 804 from a first switching fabric and input 805 from a second switching fabric and provides output 803. A fabric activity input 808 is coupled to multiplexer 802. Multiplexer 802 normally selects its input between inputs 804 and 805 dependent upon a state of fabric activity input 808. However, override mode input 807, which is coupled to multiplexer 802 is used to place multiplexer 802 into an override mode, in which multiplexer 802 selects its input according to a state of fabric selection input 806, which is also coupled to multiplexer 802.

Figure 9:
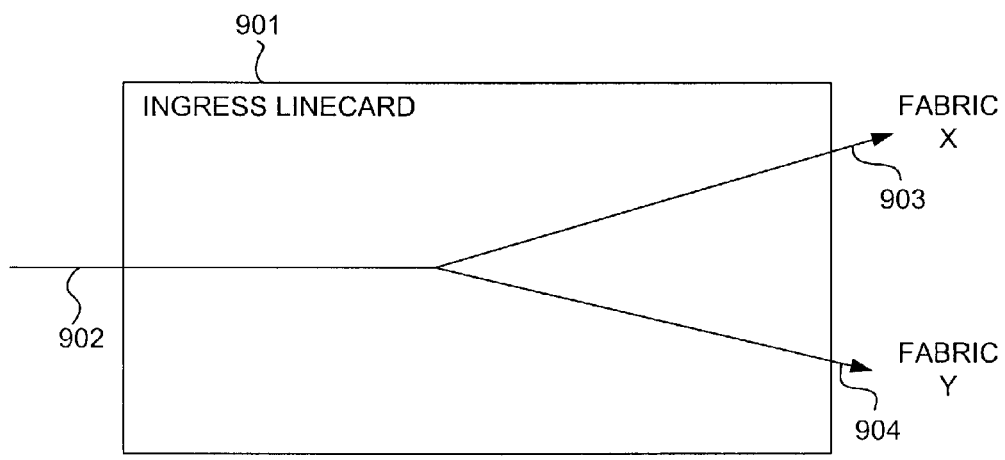
FIG. 9 is a block diagram illustrating an ingress line card capable of supporting redundant switching fabrics in accordance with an embodiment of the invention.

FIG. 9 is a block diagram illustrating an ingress line card capable of supporting redundant switching fabrics in accordance with an embodiment of the invention. The ingress line card 901 may be a separate line card providing an ingress path for cells to the switching fabric or merely a portion of a line card providing such an ingress path. Ingress line card 901 includes input 902 and outputs 903 and 904. Ingress line card 901 provides network traffic present at input 902 to switching fabrics coupled to outputs 903 and 904, and can do so simultaneously. Thus, both switching fabrics can simultaneously remain ready to switch network traffic.

Figure 10:
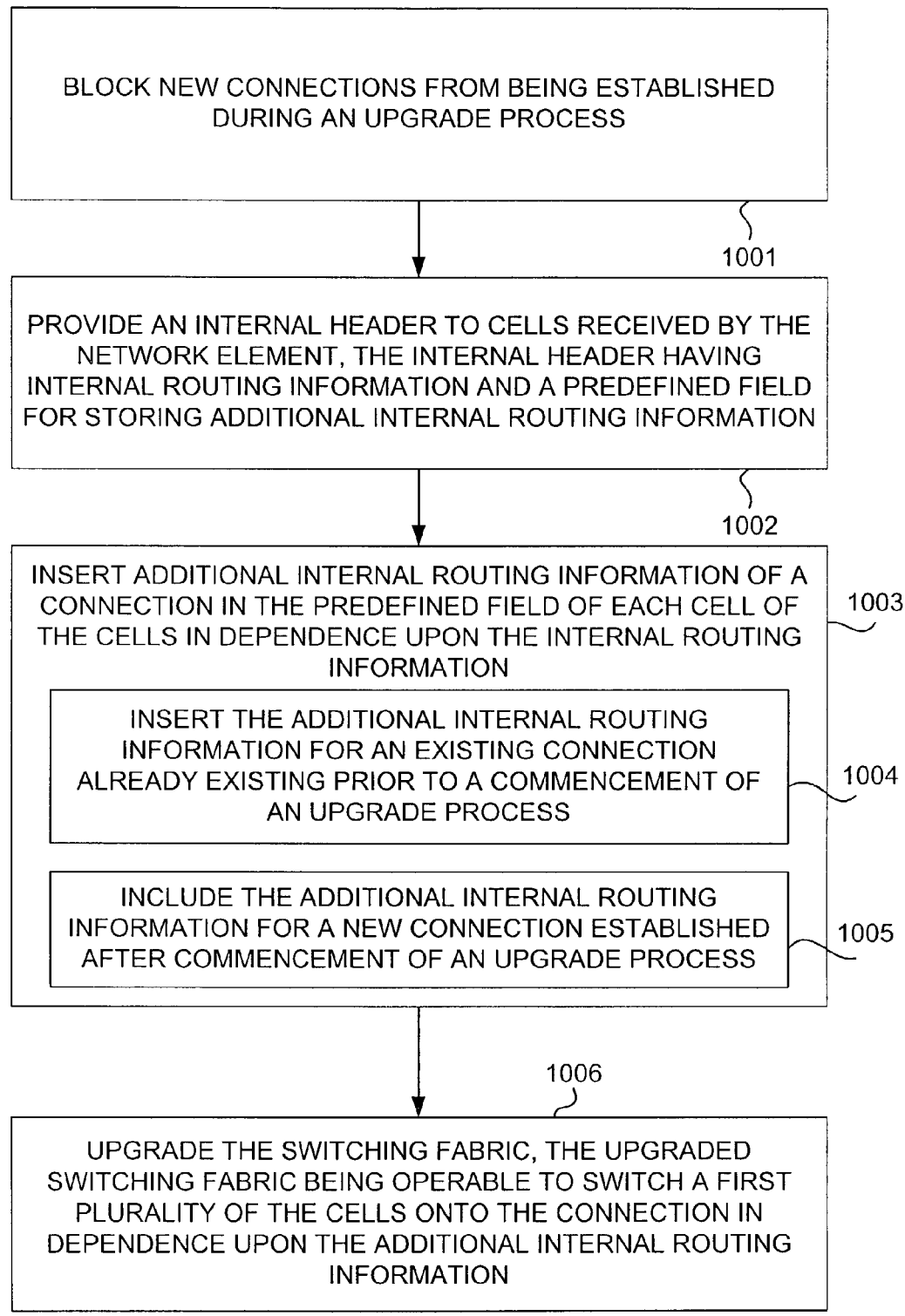
FIG. 10 is a flow diagram illustrating a method for performing an in-service upgrade of a switching fabric of a network element in accordance with an embodiment of the invention.

FIG. 10 is a flow diagram illustrating a method for performing an in-service upgrade of a switching fabric of a network element in accordance with an embodiment of the invention. In step 1001, which is optional, new connections are blocked from being established during an upgrade process. By omitting step 1001, a method may be performed which allows new connections to be established during the upgrade process. Such new connections may be accommodated, for example, in accordance with step 1005, as described below. In step 1002, an internal header is provided to cells received by the network element. The internal header has internal routing information and a predefined field for storing additional internal routing information. In step 1003, additional internal routing information of a connection is inserted in the predefined field in dependence upon the internal routing information. Step 1003 may include steps 1004 and/or 1005. In step 1004, the additional internal routing information is inserted for an existing connection already existing prior to a commencement of an upgrade process. In step 1005, the additional internal routing information is included in the predefined field for a new connection established after commencement of the upgrade process. In step 1006, the switching fabric is upgraded. The upgraded switching fabric is operable to switch a first plurality of cells onto the connection in dependence upon the additional internal routing information. In one embodiment, prior to the upgrading of the switching fabric, the switching fabric is operable to switch a second plurality of cells on the connection in dependence upon the internal routing information.

Figure 11:
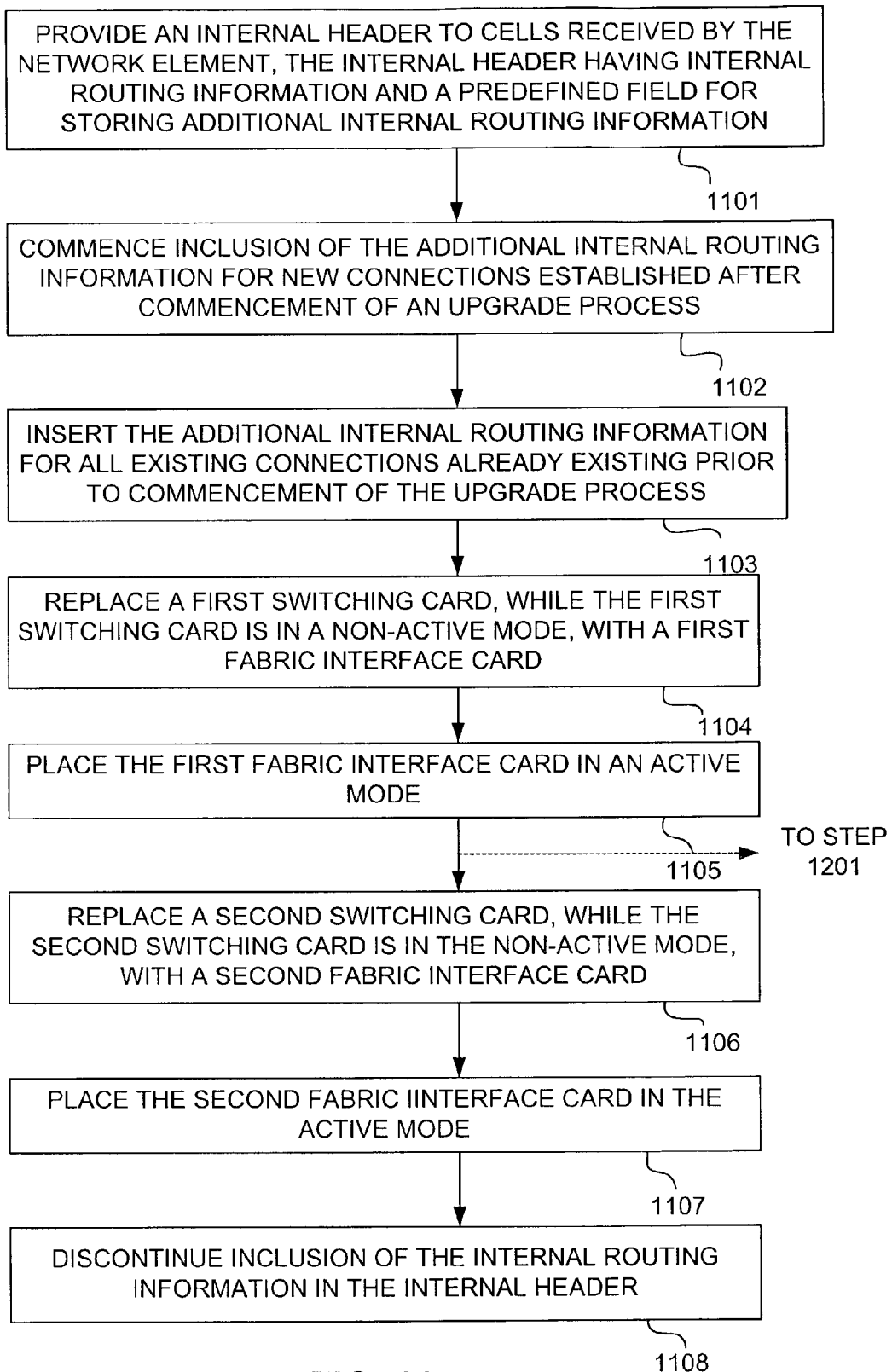
FIG. 11 is a flow diagram of a method for performing an in-service upgrade of a switching fabric of a network element in accordance with an embodiment of the invention.

FIG. 11 is a flow diagram of a method for performing an in-service upgrade of a switching fabric of a network element in accordance with an embodiment of the invention. In step 1101, an internal header is provided to cells received by the network element. The internal header has internal routing information and a predefined field for storing additional internal routing information. In step 1102, inclusion of the additional internal routing information for new connections established after commencement of an upgrade process commences. As an example, a control card programs line cards to begin including additional internal routing information for all cells of all new connections. In one embodiment, the internal routing information is bit-mapped, for example, designating destinations for cells with bits corresponding to those destinations set to a particular value, and the additional internal routing information is non-bit-mapped, for example, designating a particular destination for a cell using a plurality of bits rather than a mapping of bits to destinations.

In step 1103, the additional internal routing information is inserted in the predefined field for all existing connections already existing prior to commencement of the upgrade process. As an example, a control card programs line cards to begin including additional internal routing information for all cells of all existing connections. In step 1104, while a first switching card is in a non-active mode, the first switching card is replaced with a first fabric interface card. In step 1105, the first fabric interface card is place in an active mode. When a switching fabric is in a non-active mode, the network element does not rely on that switching fabric for switching of cells passing through the network element. When a switching fabric is in an active mode, the network element relies on that switching fabric for switching of cells passing through the network element.

Following step 1105, a decision may be made as to whether or not to continue with the upgrade process. For example, if the upgrade process appears to be causing adverse effects on the switching of network traffic or some other anomalous behavior is noted, a decision may be made to back out of the upgrade process and revert to the configuration of the network element prior to the commencement of the upgrade process. In the event that it is decided to back out of the upgrade process, the reversion process illustrated in FIG. 12 may be performed. Otherwise, the process continues at step 1106. In step 1106, a second switching card is replaced with a second fabric interface card while the second switching card is in the non-active mode. In step 1107, the second fabric interface card is placed in the active mode. In step 1108, inclusion of the internal routing information in the internal header is optionally discontinued.

In one embodiment, the additional internal routing information is designated as having a length greater than that needed to contain information sufficient to switch a first plurality of cells onto the connection in dependence upon the additional internal routing information. Thus, an excess length of the additional internal routing information is available for other information. As an example, this excess length may be reserved for future use or used for other purposes, for example, for differentiating a plurality of qualities of service. In one embodiment, storage of a switching card bit map in a portion of the internal header used for the internal routing information is discontinued. Optionally, the space in the internal header formerly occupied by the switching card bit map may be reserved for future use or use for other purposes. In one embodiment of the method illustrated in FIG. 11, the upgrade process does not result in cells failing to reach their destinations. Thus, no data is lost during the upgrade process. Since the network element may remain in service switching cells during the upgrade process, the upgrade process may be referred to as an in-service upgrade.

Figure 12:
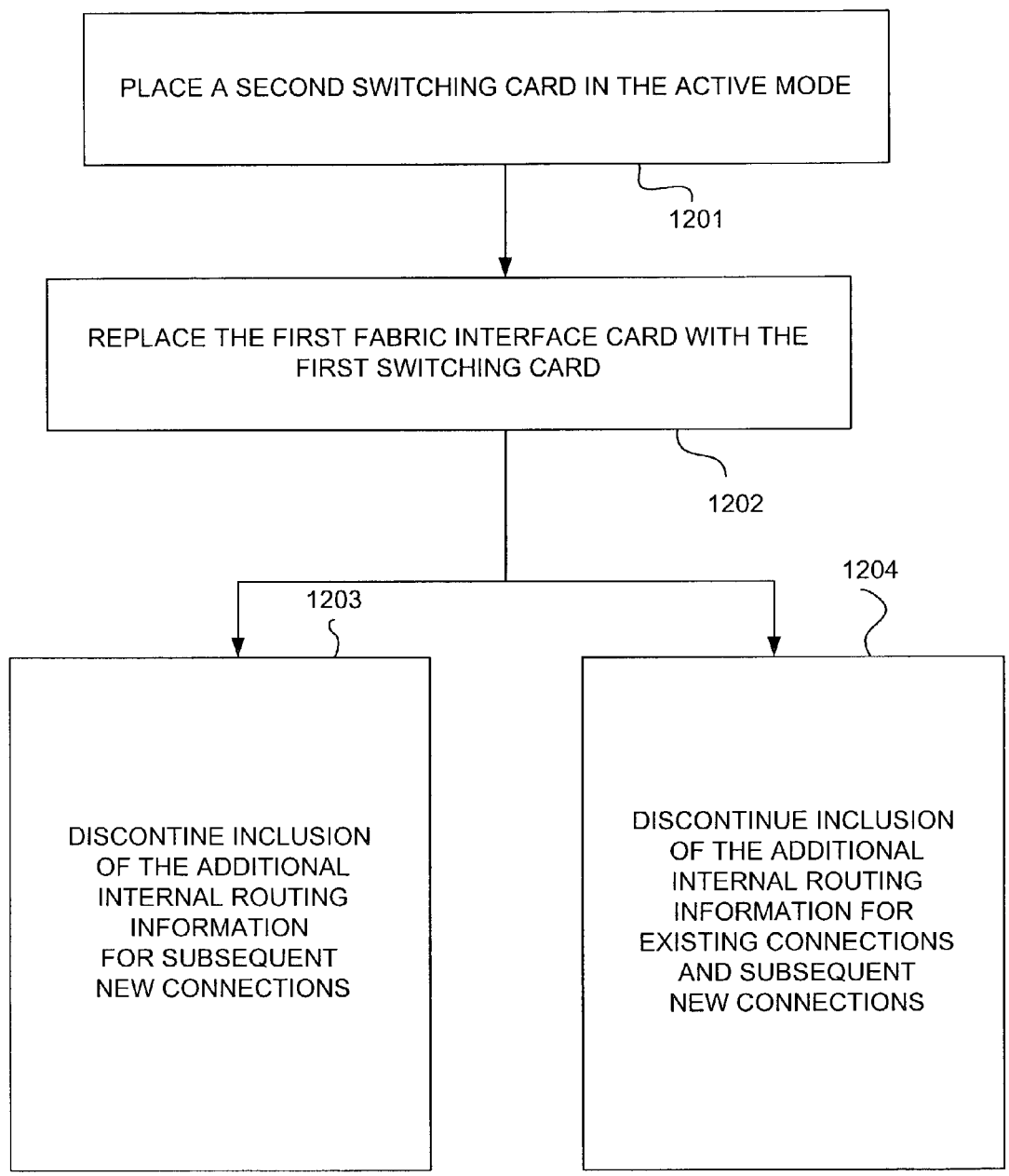
FIG. 12 is a flow diagram illustrating a method for backing out of an upgrade process in accordance with an embodiment of the present invention.

FIG. 12 is a flow diagram illustrating a method for backing out of an upgrade process in accordance with an embodiment of the present invention. As noted above, the steps of FIG. 12 may be performed following certain steps of illustrated in FIG. 11, for example, following step 1105. In step 1201, a second switching card is placed in the active mode. In step 1202, the first fabric interface card is replaced with the first switching card. From step 1202, the method may continue to either of steps 1203 or 1204. In step 1203, inclusion of the additional internal routing information is discontinued for subsequent new connections. As an example, a control card programs line cards to discontinue inclusion of the additional internal routing information for subsequently established new connections. In step 1204, inclusion of the additional internal routing information is discontinued for existing connections and subsequent new connections. As an example, a control card programs line cards to discontinue inclusion of the additional internal routing information for both existing connections and subsequently established new connections.

Accordingly, a method and apparatus for performing an in-service upgrade of a switching fabric of a network element has been described. It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for performing an in-service upgrade of a switching fabric of a network element, the method comprising the steps of:

providing an internal header to cells received by the network element, the internal header having internal routing information and a predefined field for storing additional internal routing information;

inserting additional internal routing information of a connection in the predefined field of each cell of the cells in dependence upon the internal routing information; and upgrading the switching fabric, the upgraded switching fabric being operable to switch a first plurality of the cells onto the connection in dependence upon the additional internal routing information, wherein the step of inserting the additional internal routing information further comprises:

inserting the additional internal routing information for an existing connection already existing prior to a commencement of an upgrade process.

2. The method of claim 1 wherein, prior to the step of upgrading the switching fabric, the switching fabric is operable to switch a second plurality of the cells on the connection in dependence upon the internal routing information.

3. The method of claim 1 wherein the step of inserting the additional internal routing information further comprises the step of:

including the additional internal routing information for a new connection established after commencement of the upgrade process.

4. The method of claim 1 further comprising the step of:

blocking new connections from being established during the upgrade process.

5. A method for performing an in-service upgrade of a switching fabric of a network element, the method comprising the steps of:

providing an internal header to cells received by the network element, the internal header having internal routing information and a predefined field for storing additional internal routing information;

commencing inclusion of the additional internal routing information for new connections established after commencement of an upgrade process;

inserting the additional internal routing information for all existing connections already existing prior to commencement of the upgrade process;

replacing a first switching card, while the first switching card is in a non-active mode, with a first fabric interface card;

placing the first fabric interface card in an active mode.

6. The method of claim 5 further comprising the step of:

replacing a second switching card, while the second switching card is in the non-active mode, with a second fabric interface card.

7. The method of claim 6 further comprising the step of:
placing the second fabric interface card in the active mode.

8. The method of claim 7 further comprising the step of:
discontinuing inclusion of the internal routing information in the internal header.

9. The method of claim 5 placing a second switching card in the active mode.

10. The method of claim 9 further comprising the step of:
replacing the first fabric interface card with the first switching card.

11. The method of claim 10 further comprising the step of:
discontinuing inclusion of the additional internal routing information for subsequent new connections.

12. The method of claim 10 further comprising the step of:
discontinuing inclusion of the additional internal routing information for existing connections and subsequent new connections.

13. The method of claim 5 wherein the additional internal routing information is designated as having a length greater than that needed to contain information sufficient to switch a first plurality of the cells onto the connection in dependence upon the additional internal routing information, wherein an excess length of the additional internal routing information is available for other information.

14. The method of claim 5 wherein storage of a switching card bit map in a portion of the internal header used for the internal routing information is discontinued.

15. The method of claim 5 wherein the internal routing information is bit-mapped and the additional internal routing information is non-bit-mapped.

16. The method of claim 5 wherein the upgrade process does not result in cells failing to reach their destinations.

17. A switching system comprising:
at least one line card;
at least one switching card, the at least one switching card coupled to the line card, the at least one switching card adapted to be replaceable by fabric interface cards;
at least one control card coupled to the at least one line card and the at least one switching card, the at least one control card adapted to program the at least one line card to insert additional internal routing information into a predefined field.

18. The switching system of claim 17 wherein the at least one line card inserts internal routing information into a portion of an internal header other than the predefined field, wherein the internal header includes the predefined field.

19. A switching system comprising:
a line card;
a fabric interface card coupled to the line card and to a switching shelf, the fabric interface card and the switching shelf adaptable to replace a switching card;
a control card coupled to the line card, the control card adaptable to cause the line card to communicate cells without interruption during replacement of the switching card.

20. A line card comprising:
a cell modification circuit for modifying a first cell and a second cell to include an internal header, the internal header including internal routing information and a predefined field for storing additional internal routing information, wherein the line card is adaptable to be coupled at a first time to a switching fabric, the switching fabric being operable to switch the first cell in dependence upon the internal routing information, and to be coupled at a second time to an upgraded switching fabric, the upgraded switching fabric being operable to switch the second cell in dependence upon the additional internal routing information.

21. The line card of claim 20 wherein the cell modification circuit inserts the additional internal routing information into the predefined field of the internal header.

22. A control card comprising:
a connection management subsystem adaptable to program a line card to modify a cell to include an internal header, the internal header including internal routing information and a predefined field for storing additional internal routing information; and
a fabric management subsystem adaptable to control a first switching fabric and a second switching fabric, the first switching fabric adaptable to switch the cell in dependence upon the internal routing information and the second switching fabric adaptable to switch the cell in dependence upon the additional internal routing information.

* * * * *